Figure 1:
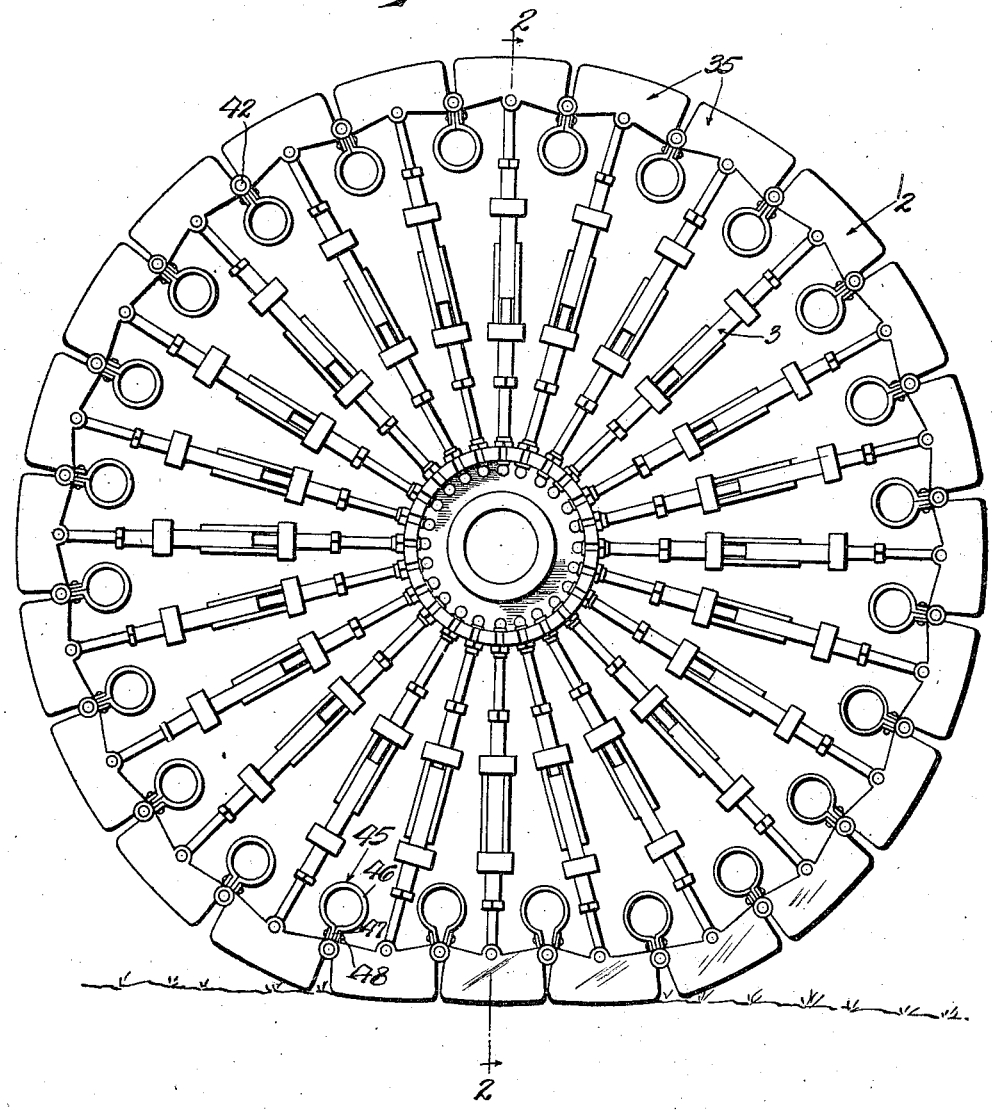

July 10, 1923.

T. S. HALLETT 1,461,483

RESILIENT VEHICLE WHEEL

Filed June 8, 1921

3 Sheets-Sheet 1

Inventor

T. S. Hallett.

By

Lacey & Lacey, Attorneys

July 10, 1923.
T. S. HALLETT
1,461,483
RESILIENT VEHICLE WHEEL
Filed June 8, 1921
3 Sheets-Sheet 2
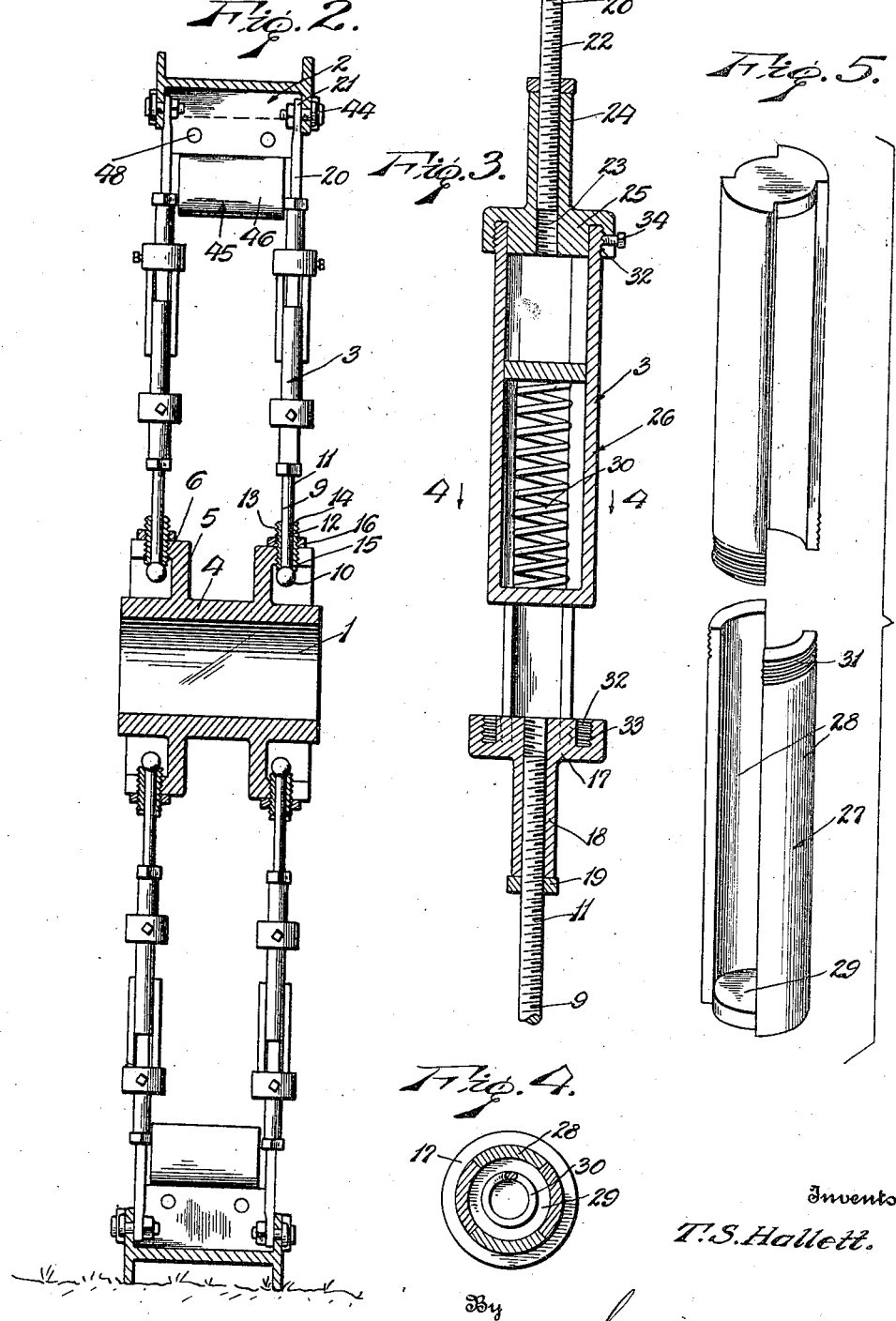
Inventor
T. S. Hallett.
By
Lacey & Lacey, Attorneys July 10, 1923.
T. S. HALLETT
1,461,483
RESILIENT VEHICLE WHEEL
Filed June 8, 1921
3 Sheets-Sheet 3
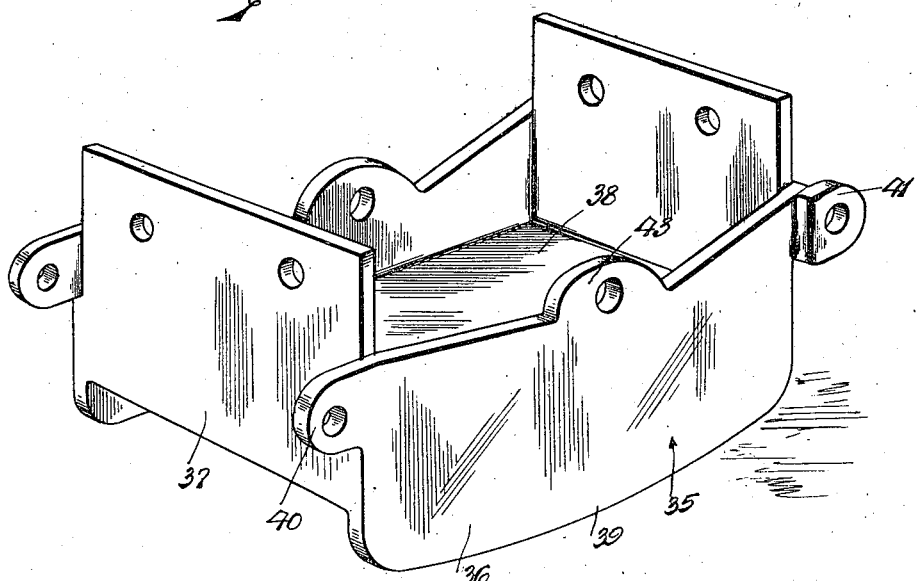
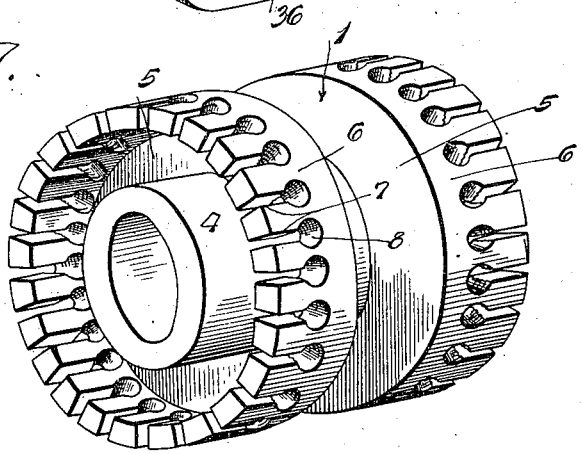
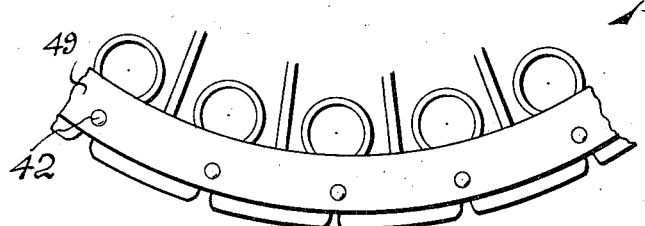
Inventor
T. S. Hallett.
By Lacey & Lacey, Attorneys Patented July 10, 1923.

1,461,483

UNITED STATES PATENT OFFICE.

THOMAS S. HALLETT, OF MILE 54, ALBERTA, CANADA.

RESILIENT VEHICLE WHEEL.

Application filed June 8, 1921. Serial No. 476,034.

*To all whom it may concern:*

Be it known that I, THOMAS S. HALLETT, citizen of Canada, residing at Mile 54, in the Province of Alberta and Dominion of Canada, have invented certain new and useful Improvements in Resilient Vehicle Wheels, of which the following is a specification.

This invention relates to improvements in resilient vehicle wheels and more particularly that type comprising a hub, an annular series of tread members, and means yieldably supporting the tread members with relation to the hub, and the general object of the invention is to provide a wheel of this type which will possess substantially the same degree of resiliency as a pneumatic tired wheel, thus adapting it to absorb shocks and impacts in passing over inequalities in the road surface.

One of the more specific objects of the invention is to so mount the tread members of the wheel that the tread as a whole will yield, in passing over inequalities in the road surface, and in a manner to most effectually cushion the impact of the wheel with such inequalities.

In the wheel embodying the invention, the tread members are mutually pivotally connected throughout the series, and another object of the invention is to provide means interposed between the end walls of adjacent members for yieldably holding the members spread apart or separate upon their pivots, this means yieldably resisting movement of the ends of adjacent members toward each other about their pivots and which movement occurs as the members are successively brought into contact with the road surface, so that not only are the members cushioned with relation to the hub, but they are also cushioned with relation to each other, and maintained in true annular series except where the tread of the wheel comes in contact with the ground surface.

Another object of the invention is to provide an improved construction of resilient spokes for a wheel of the class referred to and to provide for adjustment of the members comprising the spokes so that the compression force of the springs may be varied as required.

Another object of the invention is to so construct the hub and spokes that the spokes may be readily and conveniently assembled with the hub and disconnected therefrom in the event repairs become necessary.

In the accompanying drawings:

Figure 1 is a side elevation of the wheel embodying the invention,

Figure 2 is a vertical diametric sectional view taken substantially on the line 2—2 of Figure 1, on an enlarged scale, Figure 3 is a detail longitudinal sectional view through a portion of one of the spokes of the wheel, Figure 4 is a transverse sectional view taken substantially on the line 4—4 of Figure 3, Figure 5 is a group perspective view illustrating two of the members of the spokes relatively separated, Figure 6 is a perspective view of one of the tread members of the wheel, Figure 7 is a perspective view of the hub, Figure 8 is a side elevation illustrating a means which may be employed for the purpose of rigidly connecting the tread members of the wheel in the event it should become desirable.

Generally speaking, the wheel embodying the invention comprises a hub which is indicated in general by the numeral 1, a tread indicated by the numeral 2, and spokes which radiate from the hub and support the members comprising the tread and which are indicated by the numeral 3.

The hub 1 of the wheel comprises a body 4 having a bore which is to be shaped to adapt the hub to be fitted to an axle spindle to rotate freely thereon or to have driving connection therewith, depending upon whether the wheel is to be employed upon the front or the rear axle of an automobile, and inasmuch as any of the usual constructions may be resorted to for this purpose and the invention is not concerned with any specific interior construction of the hub, it will be understood that I am at liberty to variously design the hub as regards this portion thereof. In accordance with the invention, the body 4 of the hub is formed inwardly of each of its ends with a radial circumscribing flange 5 having an outwardly projecting portion 6 concentric to the axis of the hub and spaced from the outer surface of the hub body 4, the portions 6 of the flanges 5 projecting in the direction of the respective ends of the hub body. The portions 6 of the flanges 5 of the hub are formed each with a circumferential series of slots 7 which open at their ends through the outer edges of the said portions of the flanges and which terminate at their inner ends in openings 8, the walls of which are threaded, the slots extending parallel to one another and to the axis of the hub, and the said slots and openings in the portions 6 of the flanges 5 being oppositely located. It will be observed at this point that the slots 7 are of a width less than the diameter of the respective openings 8, and the purpose of thus proportioning the parts will presently be made clear.

Each of the spokes 3 comprises two longitudinally alined sections, and the inner section of each spoke includes in its structure a stem which is indicated by the numeral 9 and which is provided at one end with a spherical knob or enlargement 10, and at its other end is threaded as indicated by the numeral 11. The stem 9 is of a diameter to permit of its being introduced through one or another of the slots 7, in assembling the spokes with the hub, and loosely fitted onto the stem 9 of each spoke is a bushing 12 which, after engagement of the inner end of the stem 9 through the respective slot 7, is to be slid longitudinally radially inward upon the stem and threaded into the respective opening 8, the bushing being exteriorly formed with threads 13 for this purpose and being provided at its outer end with some means for the application of a suitable wrench as for example, with notches 14 adapting it for the application of a spanner wrench. The inner end of the bushing 12 is concaved or cupped as indicated by the numeral 15, so as to adapt it to snugly bear against the spherical knob or head 10 at the inner end of the respective stem 9. A jam nut 16 is threaded onto the bushing 12 and may be tightened so as to bear against the outer pheripheral surface of the portion 6 of the respective flange 5 for the purpose of holding the bushing against rotation after it has been adjustably threaded into place and the desired adjustment of the parts, as will presently be explained, has been obtained. The inner section of the spoke further comprises a head 17 provided with a sleeve-like or tubular extension 18 which is interiorly threaded and receives the threaded end 11 of the respective stem 9, a jam nut 19 being likewise threaded onto this portion of the stem to bear against the end of the extension 18 and thus hold the parts at adjustment. The outer section of each spoke comprises a stem which is indicated in general by the numeral 20 and which is provided at its outer end with an ear 21 whereby it may be pivotally connected with the respective tread member in a manner to be presently explained, and at its inner end is threaded as indicated by the numeral 22, this latter end of the stem being adjustably threaded into a bore 23 formed in a tubular or sleeve-like extension 24 of a head 25 which corresponds in structure to the head 17. Interposed between the heads 17 and 25 of the inner and outer sections of the spoke is the cushioning means for the spoke which comprises a housing consisting of relatively slidable sections, and a spring disposed within and between the said sections. The housing above referred to is indicated in general by the numeral 26 and the same is in the form of a substantially cylindrical barrel comprising sections indicated in general by the numeral 27. These sections are of counterpart form and each comprises a pair of spaced members 28 having the form of substantially one-fourth of a hollow cylinder divided longitudinally, the lateral or longitudinal edges of the members 28 being disposed in planes radial to the axis of the barrel as a whole and the sections being fitted together with the said edges of their members 28 in sliding contact as best illustrated in Figure 4 of the drawings. The members 28 of each section 27 are connected at one end by an integral web 29 which is of circular form and of a diameter equal to the internal diameter of the barrel so that the inner surfaces of the members 28 of one section 27 will have sliding contact with the peripheral portions of the web 29 of the other sections 27 which portions are located between the connected ends of the members 28 of the said other section. Thus, when the sections are assembled, in the proper manner illustrated in the drawings, the unconnected ends of the members 28 of each section will project beyond the connected ends of the members of the other section, and the webs 29 of the sections will be slidably received between the members 28 of the companion sections. The cushioning spring above referred to is indicated by the numeral 30, and the said spring is arranged within the barrel formed by the interfitting sections 27 and bears at its ends between the web 29 of the two sections. Inasmuch as the tendency of the spring 30 is to expand, it will exert pressure in opposite directions longitudinally against the webs 29 of the two barrel sections thus tending to separate the web ends of these sections, it being understood that relative movement of the sections in a direction tending to bring their web ends together, will be against the compression of the said spring 30. The members 28 of each section 27 are exteriorly threaded as at 31 at their unconnected ends and at their said ends are fitted in circular seats or grooves 32 formed in the opposing faces of the heads 17 and 25, the outer wall of the each groove being threaded as at 33 to coact with the threads 31 of the associated section 27. It will now be evident that the unconnected ends of the members 28 of the two sections 27 are to be threaded into the respective heads 17 and 25 after the sections 27 have been mutually assembled and the spring 30 has been interposed between them and within the cylindrical barrel formed by them, and in this manner the inner and outer sections of the spokes are connected together. In order to prevent accidental disengagement of the ends of the sections 27 from the grooves 32, set screws 34 may be threaded through the peripheries of the heads 17 and 25 to bind against the ends of the portions 28 of the sections 27, as best shown in Figure 3 of the drawings.

The tread of the wheel comprises an annular series of tread members, one of which is clearly illustrated in detail in Figure 6 of the drawings, and indicated in general by the numeral 35. The said tread member is preferably of integral construction and comprises spaced side portions 36, end portions 37 which extend between and connect the opposite ends of the side portions 36, and a web portion 38 which extends across the space bounded by the side and end portions. The outer edges 39 of the side portions 36 preferably project a suitable distance beyond the plane of the outer face of the web portion 38, in order to provide a non-slipping tread. The outer edges of the end portions 37, however, terminate at this plane, and the said edges of the portions 36, which are indicated by the numeral 39, are longitudinally curved on such an arc that when all of the tread members are assembled in a series, their edges 39 will all touch a common circle. The side portions 36 of the tread member are formed at their inner corners with pivot ears, certain of which are indicated by the numeral 40 and others by the numeral 41, the ears 40 being located at one end of the tread member and occupying substantially the same plane as the respective side portion 36, and the ears 41 being offset whereby when a number of the members are assembled end to end, the ears 40 and 41 of adjacent members will overlap and may be pivotally connected together by means of bolts 42. In this manner, the tread members 35 are connected in a continuous annular series and it will be evident that the members may have limited relative movement about the connecting pivot bolts 42. Each side portion 36 of each member 35 is formed or provided at its inner edge and midway between its ends with an upstanding apertured ear 43, and it is to these ears 43 that the outer ends of the stems 20 of the spokes are pivotally connected by means of bolts 44 as best shown in Figures 1 and 2 of the drawings. It will now be evident that the springs 30 of the entire number of spokes exert a centripetal action upon the members comprising the tread of the wheel, and by adjusting the stems 9 and 20, either by turning them in their respective sleeves 18 and 24, or by turning the bushings 12 in the threaded openings 8, the pressure of all of the springs 30 may be equalized so that the hub will be maintained in concentric relation to the tread of the wheel and yieldably supported with relation to the tread. It will also be evident, and particularly by reference to Figure 1 of the drawings, that a plurality of the tread members 35 will simultaneously contact the road surface in the travel of the wheel thereover and will yield in an inward direction, the springs 30 of the spokes on the opposite side of the wheel, resiliently suspending the hub within the bounds of the tread and cushioning the travel of the wheel over inequalities in the road surface and absorbing shock incident to contact of the wheel with such inequalities.

Not only may the tread members 35 have relative movement upon their connecting pivots but they are also pivotally movable upon the bolts 44 which connect them with the outer ends of the spokes 3, and in order to yieldably resist pivotal movement of the members and maintain them in true circumferential alinement except when they are in contact with the road surface, means is provided which will now be described. Interposed between each two adjacent tread members 35 is a spring indicated in general by the numeral 45 and constituting the means above referred to. This spring 45 comprises a bowed substantially circular intermediate portion 46 and relatively flat end or terminal portions 47 which latter are disposed against the outer faces of the end portions 37 of adjacent tread members 35 and secured thereto by rivets or otherwise as indicated by the numeral 48. Normally, the intermediate portions 46 of the leaf springs 45 are closed to circular or cylindrical form and the end portions 47 of the springs are in contact and by reason of such contact the connected tread members 35 are held in relatively stationary position upon their respective pivots so as to assume a substantially circumferential alinement throughout the entire series. However, in the travel of the wheel over a road surface, the tread members 35 will be inwardly displaced as they contact the road surface and will be influenced to have relative movement upon their connecting pivots 42, the outer corners of the side portions 36 of adjacent tread members 35 being at such time brought together and substantially in contact as shown in the lower portion of Figure 1 of the drawings. Upon such pivotal movement of the members 35 with relation to each other, their adjacent end portions 37 will be relatively separated as illustrated in the said Figure 1, and thus the ends of the associated springs 45 will be spread apart against the tension of the said springs. Thus, the pivotal movement of the tread members with relation to one another is yieldably resisted by the springs 45 and these springs serve to return the said members to normal position and into the circumferential line of the series, as the members leave the road surface in the rotation and travel of the wheel.

Should it for any reason be found desirable to restrain the tread members against relative pivotal movement, an annulus 49 may be disposed against the opposite sides of the tread of the wheel and secured in place by the bolts 42 which otherwise would pivotally connect the tread members, as illustrated in Figure 8 of the drawings.

Having thus described the invention, what is claimed as new is:

1. In a resilient wheel, a hub, a plurality of tread members, means resiliently connecting said members with the hub and adapted to draw the tread members toward the hub, means mutually pivotally connecting adjacent ones of the said tread members, and means interposed between the ends of adjacent ones of the tread members and yieldably holding the members rocked upon their pivots in a direction to relatively spread their adjacent connected ends.

2. In a resilient wheel, a hub, a tread comprising a plurality of mutually pivotally connected members, means resiliently connecting the hub and tread members, and bowed springs interposed between the connected ends of adjacent tread members and normally closed and holding the members rocked upon their pivots in a direction to separate their said adjacent connected ends.

3. In a resilient wheel, a hub, a tread comprising a plurality of tread members mutually pivotally connected at their adjacent inner corners, means resiliently connecting the hub and tread members, and bowed springs arranged between adjacent ones of the said members and having their ends connected thereto, the said springs yieldably holding the members rocked upon their pivots in a direction to mutually spread their connected adjacent ends.

4. In a resilient wheel, a hub, a tread comprising a plurality of mutually pivotally connected tread members, the said members having end portions extending transversely, means resiliently connecting the hub and tread members, and normally closed bowed springs arranged opposite the connected ends of adjacent ones of the tread members and having terminal portions secured to the end portions of the said tread members, the springs yieldably resisting pivotal movement of the said tread members with relation to one another.

5. In a wheel of the class described, a hub, a tread comprising a plurality of connected sections, and spokes radiating from the hub and connected with the members of the tread and comprising resiliently connected sections, and means whereby the sections of the spokes may be relatively adjusted to adjust the tension of the springs, said means comprising a sleeve on one of the sections of each spoke engaging said hub.

6. In a resilient wheel, a hub, a tread comprising a plurality of sections, and spokes extending radially from the hub and connected with the sections, the said hub comprising portions circumscribing its body in spaced relation thereto and provided with slots opening through one edge of each portion and terminating at their inner ends in threaded openings the spokes each comprising an inner and an outer section and the inner section including a stem having an enlarged inner end, the stems being of a diameter to pass through the respective slots in the said portions of the hub, and a bushing sleeve fitted onto each of the stems and movable longitudinally thereof and threaded into the respective opening in the said portions of the hub, and means resiliently connecting the inner and outer sections of each spoke.

7. In a resilient wheel, a hub, a tread, and resilient spokes extending radially from the hub and connected with the tread, each of said spokes comprising an inner section connected with the hub and an outer section connected with the tread, the said sections of the spokes further comprising cooperating barrel sections relatively slidable, and a cushioning spring housed within and between the said barrel sections.

8. In a resilient wheel, a hub, a tread, and resilient spokes extending radially from the hub and connected with the tread, each of said spokes comprising an inner section connected with the hub and an outer section connected with the tread, the said sections of each of the spokes further comprising cooperating barrel sections relatively slidable, and a cushioning spring housed within and between the said barrel sections, the said barrel sections being adjustably connected with the respective spoke sections whereby to provide for adjustment of the tension of the respective cushioning springs.

In testimony whereof I affix my signature.

THOS. S. HALLETT. [L. S.]